Patented Nov. 14, 1950

2,530,348

UNITED STATES PATENT OFFICE 2,530,348

HALOGENATED DERIVATIVES OF ALIPHATIC ACIDS, LACTONES AND METHOD OF MAKING SAME

Edgar C. Britton and John C. Vander Weele, Midland, Mich., and John E. Livak, Clemson, S. C., assignors to The Dow Chemical Company, Midland, Mich., a corporation of Delaware No Drawing. Application November 7, 1946,
Serial No. 708,462

9 Claims. (Cl. 260—344)

This invention concerns certain new halogen-containing derivatives of saturated aliphatic monocarboxylic acids having at least 4 carbon atoms in a carbon chain of the acyl radical and a method of making the derivatives. It pertains especially to alpha-halolactones of the gamma-hydroxy-aliphatic carboxylic acids and the preparation of such halolactones.

We have found that halogens, e. g. fluorine, bromine, or bromochloride, etc., may be reacted directly with a lactone of a gamma-hydroxy-aliphatic monocarboxylic acid having 4 or more carbon atoms in a chain of the acyl radical to form a corresponding alpha-gamma-dihalo-aliphatic carboxylic acid which is thermally unstable and may be dehydrohalogenated by heating to produce an alpha-halolactone of the gamma-hydroxy carboxylic acid as an ultimate product. The alpha-halo-gamma-lactones thus produced are useful as chemical agents for the preparation of a wide variety of more complex derivatives of the aliphatic carboxylic acid. They are particularly useful as intermediate agents in a method for the production of methionine and its homologues.

Any lactone of a saturated gamma-hydroxy-aliphatic monocarboxylic acid may be used as a starting material in the process. Examples of such starting materials are the lactones of gamma-hydroxy-butyric acid, gamma-hydroxy-valeric acid, gamma-hydroxy-isovaleric acid, gamma-hydroxy-caproic acid, etc. The lactone of gamma-hydroxy-butyric acid is readily available as a by-product from the destructive distillation of wood, and the alpha-halo derivatives of this lactone are useful as intermediates in the synthesis of methionine itself. For these reasons the lactone of gamma-hydroxy-butyric acid is a preferred starting material.

The lactones may be halogenated by passing a halogen, e. g. chlorine or bromine, into the same while heating the mixture at a temperature sufficient to cause fairly rapid reaction. The halogenation occurs most readily and rapidly when carried out in the presence of a substance capable of forming an addition compound with an acyl halide, e. g. acetyl chloride. Examples of substances having this property and useful as catalysts for the halogenation are phosphorus trichloride, phosphorus pentachloride, phosphorus tribromide, aluminum chloride, ferric chloride, etc. The phosphorus halides are particularly effective for the purpose and are preferred. Only a minor amount, e. g. 0.02 molecular equivalent, or less, of a phosphorus halide is required per mole of the lactone reactant in order to obtain halogenation at a rapid rate. The halogenation is usually carried out at temperatures in the order of from 80° to 150° C., but it may be accomplished at lower, or somewhat higher, temperatures if desired. The halogen apparently adds directly to the molecule of the lactone with formation of an alpha-gamma-dihalo-aliphatic carboxylic acid. Only a minor amount of hydrogen halide is evolved.

The alpha-gamma-dihalo-carboxylic acids thus produced are thermally unstable compounds which undergo dehydrohalogenation and lactone formation at temperatures below their boiling temperatures at atmospheric pressure. In some instances, they may be distilled under vacuum to collect a substantial portion thereof in undecomposed form. The alpha-gamma-dihalo-carboxylic acids may be esterified by reaction with alcohols such as methyl, ethyl, or propyl alcohol, etc., and the esters may readily be separated and purified, e. g. by distillation. The alpha-gamma-dihalo-aliphatic monocarboxylic acids are new compounds which are useful as chemical agents in forming a wide variety of more complex derivatives of the aliphatic carboxylic acids parent thereto. For instance, one or both of the halogen atoms thereof may be displaced by reaction of such compound, or an ester thereof, with an alkali salt of a carboxylic acid so as to form a complex polyester. The alpha-gamma-dihalo-carboxylic acids have the general formula:

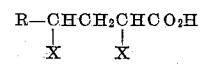

wherein each X represents a halogen atom, e. g. chlorine or bromine, and R represents hydrogen or an alkyl radical.

An alpha-gamma-dihalo-aliphatic carboxylic acid prepared as described above is readily dehydrohalogenated to form a corresponding alpha-halo-gamma lactone by heating the same to a temperature at which hydrogen halide is evolved. The dehydrohalogenation action usually occurs rapidly upon heating the dihalo compound at temperatures in the order of from 100° to 150° C. at sub-atmospheric pressure. Higher temperatures may in some instances be required, particularly when the decomposition is carried out at atmospheric pressure. The alpha-halo-lactone product is readily purified by distillation.

The following examples describe certain ways in which the invention has been practiced, but are not to be construed as limiting the scope of the invention.

Example 1

A solution of 71 grams of phosphorus tribromide and 1120 grams of gamma-butyrolactone was heated to a temperature of 100° C., and 1975 grams of bromine were added gradually and with stirring. The bromine was added at a rate of about 1 gram per second over a period of about 2.5 hours, after which the rate of bromine addition was reduced somewhat in order to avoid vaporization of free bromine from the mixture. Considerable heat was evolved during the bromination reaction which was carried out for the most part at temperatures of between 120° and 130° C. After adding the bromine, the mixture was heated at 130° C. for a period of 4 hours in order to assure substantial completion of the reaction. The crude brominated product weighed 3100 grams and consisted for the most part of alpha-gamma-dibromo-butyric acid. The yield of the crude acid was approximately 98 per cent of theoretical. The alpha-gamma-dibromo-butyric acid was heated under vacuum, first to evolve the hydrogen bromide formed by thermal decomposition of the dibromo-butyric acid, and thereafter to distill the resultant alpha-bromo-butyrolactone product. The alpha-bromo-gamma-butyrolactone is a colorless liquid which boils at from 94° to 106° C. at 1 millimeter absolute pressure, has a density at 25° C. of 1.79, and has an index of refraction, $n_D^{25}$, of 1.509. The yield of alpha-bromo-gamma-butyrolactone was 85 per cent of theoretical, based on the gamma-butyrolactone starting material.

Example 2

By procedure similar to that described in Example 1, chlorine was reacted with butyrolactone in the presence of phorphorus trichloride as a catalyst to form alpha-gamma-dichloro-butyric acid, and the latter was subjected to distillation under vacuum. In this instance, a portion of the dihalo-butyric acid was decomposed to form alpha-chloro-butyrolactone, which was collected as a fraction of distillate, and another portion distilled without decomposition and was recovered as the purified compound. The alpha-gamma-dichloro-butyric acid is a colorless liquid which distills at temperatures of from 112° to 114° C. at 4 millimeters absolute pressure, has a density at 25° C. of 1.404, and has an index of refraction, $n_D^{25}$, of 1.477. The alpha-chloro-gamma-butyrolactone is also a colorless liquid. It distills at 98° to 100° C. at 4 millimeters absolute pressure, has a density at 25° C. of 1.361, and has an index of refraction, $n_D^{25}$, of 1.469.

Example 3

Approximately 192 grams of bromine was added in dropwise manner and with stirring to a solution of 1 cubic centimeter of phosphorus tribromide in 125 grams of gamma-valerolactone while heating the mixture at temperatures of from 95° to 100° C. The bromine was added over a period of 3 hours, after which heating of the mixture at the temperatures just mentioned was continued for another 3 hours. The alpha-gamma,di-bromo-valeric acid, thus formed, was heated under vacuum, first to evolve hydrogen bromide formed due to thermal decomposition of the same, and thereafter to distill the alpha-bromo-gamma-valerolactone product. The alpha-bromo-gamma-valerolactone is a colorless liquid which boils at approximately 120° to 125° C. at 7 millimeters absolute pressure. It has a density at 25° C. of 1.595 and an index of refraction, $n_D^{25}$, of 1.4905. The yield thereof was approximately 71 per cent of theoretical, based on the amount of valerolactone consumed in the initial bromination reaction.

Other modes of applying the principle of the invention may be employed instead of those explained, change being made as regards the method or compounds herein disclosed, provided the steps or compounds stated by any of the following claims or the equivalent of such steps or compounds be employed.

We therefore particularly point out and distinctly claim as our invention:

1. The gamma lactone of an otherwise unsubstituted alpha-halo-gamma-hydroxy-butyric acid.

2. The gamma lactone of alpha-bromo-gamma-hydroxy-butyric acid.

3. In a method of making a gamma lactone of a saturated alpha-halo-gamma-hydroxy-aliphatic monocarboxylic acid, the steps of heating, at temperatures between 80° and 150° C., a mixture of a gamma lactone of a saturated gamma-hydroxy-aliphatic monocarboxylic acid and a halogenation catalyst which is capable of forming an addition compound with an acyl halide, passing a halogen into the heated mixture until at least one molecular equivalent of the halogen has been introduced per mole of the lactone starting material, and heating the mixture under substantially anhydrous conditions to a temperature at which a hydrogen halide is evolved.

4. In a method of making a lactone of a saturated alpha-bromo-gamma-hydroxy-aliphatic monocarboxylic acid, the steps of heating a mixture of one molecular equivalent of a lactone of a saturated gamma-hydroxy-aliphatic monocarboxylic acid and a catalytic proportion of a phosphorus halide at temperatures between 80° and 150° C. and passing at least one molecular equivalent of bromine into the heated mixture, thereafter heating the mixture under substantially anhydrous conditions at sub-atmospheric pressure and at temperatures between 100° and 150° C. to cause an evolution of hydrogen bromide, and separating the resultant alpha-bromo-gamma-lactone product from the reaction mixture.

5. In a method of making the lactone of alpha-bromo-gamma-hydroxy-butyric acid, the steps of passing at least one molecular equivalent of bromine into a mixture of one molecular equivalent of gamma-butyrolactone and a catalytic amount of a phosphorus bromide while heating the mixture at temperatures between 80° and 150° C., thereafter evolving hydrogen bromide from the mixture by heating the same, under substantially anhydrous conditions, at sub-atmospheric pressure and at temperatures between 100° and 150° C., and separating the resultant alpha-bromo-gamma-butyrolactone product by distillation.

6. In a method of making a lactone of a saturated alpha-halo-gamma-hydroxy-aliphatic monocarboxylic acid, the step of heating a saturated alpha,gamma-dihalo-aliphatic monocarboxylic acid under substantially anhydrous conditions to a temperature at which it is dehydrohalogenated with evolution of hydrogen halide and resultant formation of an alpha-halo-gamma-lactone of the saturated carboxylic acid.

7. In a method of making a gamma lactone of a saturated alpha-bromo-gamma-hydroxy-aliphatic monocarboxylic acid, the step of splitting hydrogen bromide from the molecule of a saturated alpha,gamma-dibromo-aliphatic monocarboxylic acid by heating the latter, under substantially anhydrous conditions and at sub-atmospheric pressure, to temperatures between 100° and 150° C.

8. In a method of making the gamma lactone of alpha-bromo-gamma-hydroxy-butyric acid, the step of splitting hydrogen bromide from the molecule of alpha,gamma-dibromobutyric acid by heating the latter, under substantially anhydrous conditions and at sub-atmospheric pressure, to temperatures between 100° and 150° C.

9. In a method of making the gamma lactone of alpha-bromo-gamma-hydroxy-valeric acid, the step of splitting hydrogen bromide from the molecule of alpha,gamma-dibromovaleric acid by heating the latter, under substantially anhydrous conditions and at sub-atmospheric pressure, to temperatures between 100° and 150° C.

EDGAR C. BRITTON.
JOHN C. VANDER WEELE.
JOHN E. LIVAK.

REFERENCES CITED

The following references are of record in the file of this patent:

UNITED STATES PATENTS

| Number | Name | Date |
|---|---|---|
| 1,757,100 | Strosacker | May 6, 1930 |
| 2,193,858 | Buchman | Mar. 19, 1940 |
| 2,365,808 | D'Ianni | Dec. 26, 1944 |
| 2,368,366 | Kyrides | Jan. 30, 1945 |
| 2,390,526 | Elderfield et al. | Dec. 11, 1945 |
| 2,411,875 | Gresham | Dec. 3, 1946 |
| 2,421,729 | Walton | June 3, 1947 |

OTHER REFERENCES

Wohlgemuth: Comptes Rendus, 158 (1914) pages 1577–1579.

Marvel et al.: Jr. Am. Chem. Soc., 51, 261 (1929).

Henry: Beilstein, vol. 17, page 234 (1933).

Karrer: Organic Chemistry, page 237 (1938).

Livak et al.: Journal of Chemical Society, vol. 67, December 1945, pages 2218 to 2220.